Patented Jan. 8, 1952

2,581,441

UNITED STATES PATENT OFFICE 2,581,441

SOLIDIFIED NONEXPLOSIVE HYDROCARBON AND PROCESS FOR PRODUCING SAME

Regis Raab, Baltimore, Md., assignor to The Glenn L. Martin Company, Middle River, Md., a corporation of Maryland No Drawing. Application February 26, 1948, Serial No. 11,318

3 Claims. (Cl. 44—7)

This invention relates to a solidified non-explosive fuel for military and civilian uses and to a process for the production of the same.

Because of the high volatility and inflammability of liquid fuels, such as gasoline and the like, various problems relating to the safe handling of such fuels have consistently appeared. For example, two of the chief difficulties have been storage and shipment of such materials.

These difficulties become apparent when considering such remote places as Alaska, Greenland, or the tropics where there are relatively few highways or railways; and the difficulty of transporting fuels would involve laying pipelines, etc., making the cost of such an operation prohibitive.

Further, when considering military maneuvers, it is obvious that fuels must be capable of being stored in strategic areas under various climatic conditions. Fast and efficient transportation to these areas also is of prime consideration. Using the non-explosive product of my invention, it is possible to deliver by cargo planes travelling at 300 M. P. H. the same quantity of fuel carried by a tanker which travels at only 10 knots. In addition, by the use of these planes, the fuel will be delivered inland to the point of use.

Attempts have been made in the past to prepare "solid" fuels, many of these employing sodium alginates as dispersing mediums, but one prime disadvantage to these processes has been the fact that the resultant product retains such a low percentage of the original starting fuel.

It is an object of this invention to prepare a solidified, non-explosive hydrocarbon using a mixture of sodium alginates at least one of which contains a polysaccharide mixture, such as dextrine, and sugar, as the dispersing medium for the liquid hydrocarbon.

It is another object of the invention to prepare a solidified fuel possessing a high percentage of available fuel and a high percentage of retained starting fuel.

It is a further object of the invention to provide a solidified fuel wherein the fuel regenerated from the solid shows practically no substantial change in characteristics from the starting fuel.

Other and further objects will be apparent to those skilled in the art from the following detailed description.

Broadly stated, the invention comprises the solution of colloidal chemicals containing polysaccharides, such as dextrine, and sugar, in water, addition of a liquid hydrocarbon to the homogeneous sol so produced and the congealing or hardening of this emulsion in a chemical bath which additionally tends to cause rejection from the final product of a certain amount of water.

Colloidal chemicals particularly suitable for use in this invention are members of the class known as algins. Chemically these substances are salts of polymerized d-mannuronic acid (alginic acid), and are hydrophilic colloidal polysaccharides, the acid being extracted from a giant kelp plant of the Pacific Ocean. Of the salts, the soluble alkali metal salts, as sodium alginate, are preferred.

The process of the invention will be better understood from the following detailed description.

The method of manufacture of the solidified fuel preferably entails several steps, the first of which involves mixing the alginate with about half of the water used in the process. The most satisfactory method of adding the alginates found is to sift the dry alginate gradually through a screen into the running mixer which contains the water. This prevents the formation of lumps by the alginates and assures a better dispersion.

The final water and the liquid hydrocarbon are combined in a second mixer which is gas tight to prevent loss by evaporation of the fuel. The liquid hydrocarbon is thus dispersed in the algin and water in droplets, having a particle size slightly larger than that of a stable emulsion.

The emulsion thus formed is then allowed to flow rapidly on to a screen suspended about a foot above the level of the calcium chloride bath. The product drops through the screen in the form of pellets into the calcium chloride bath. On hitting the bath, a chemical reaction takes place converting the water soluble sodium alginate into a water insoluble calcium alginate and the pellets set into firm gel balls. The pellets are then dried to a constant weight to remove excess water retained therein.

Although many algins may be employed, as algins preferred for use in this invention, I have found that a mixture of two gives the best results. The first algin ingredient is an unrefined sodium alginate containing about 10-12% insoluble matter in the form of cellulose. It has a fairly high viscosity of 105 centipoises (1% water solution) as determined by the Parlin cup method and a pH of 7.0. The second algin is a refined sodium alginate of low viscosity (1% water solution—5–10 centipoises as determined by the Parlin cup method), having a pH of 9.5 and possessing the following chemical ingredients:

| | Per cent |
|---|---|
| Sodium alginate | 60 |
| Dextrine | 35 |
| Sugar | [1] 5 |
| Small amounts of disodium phosphate | |

[1] In the form of sucrose.

The dextrine, sugar, and disodium phosphate are added during the process of manufacture of the sodium alginate from the kelp. This product is widely used in the manufacture of ice cream and is available commercially. The total amount of algin used is about 4% by weight of the starting liquid hydrocarbon.

I have found that the preferred concentration of the calcium chloride bath is about 10% and best results are obtained if the pellets are allowed to remain in the bath for about 10 minutes before being subjected to the drying period. If the concentration of the calcium chloride bath is too high, it has been found that a lot of calcium chloride is left in the pellets. This calcium chloride crystallizes on drying the pellets and ruptures the alginate walls, thus allowing the liquid fuel to escape.

Although the precise nature of the chemical reaction that takes place in the film forming bath has not been determined, the term calcium alginate-polysaccharide film as used herein identifies the film formed about each of the globules of liquid hydrocarbon in the calcium chloride bath.

A useful product can be obtained according to the process of my invention by the use of a mixture of the unrefined sodium alginate above described and a sodium alginate of low viscosity (in the range of 5–10 centipoises) which does not contain dextrine and sugar added during the process of its manufacture. To this mixture are added suitable amounts of disodium phosphate, dextrine, sugar, and glycerine. Before the liquid hydrocarbon is added, the pH of the whole composition is adjusted to 9.0 by the use of sodium carbonate. The procedure is then the same as before.

I have further found that addition of a wetting agent, such as soap or the like, decreases the amount of water necessary to form the dispersion of alginates, water, and liquid hydrocarbon. The dispersion shows smaller particle size and the droplets of liquid hydrocarbon seem to be more uniform. The use of smaller amounts of water decreases the time required to remove excess water and dry the pellets to constant weight.

I have further found that the addition of a polyhydroxy compound, such as glycerine, produces a more stable product. I believe that the action of such a compound is to plasticize the calcium alginate formed and would in this way form a more effective barrier to prevent escape of the liquid hydrocarbon. Compounds, similar to glycerine, which may be used include sorbitol, glycols, dextrines, starches, carbohydrates, etc.

The following example is illustrative of my process:

EXAMPLE 42 gms. sodium alginate unrefined (viscosity 150 centipoises; pH 7.0)

42 gms. sodium alginate refined and containing dextrine and sugar as above defined (viscosity 5–10 centipoises; pH 9.5)

3 liters 80 octane aviation gasoline 3.4 liters water

The ingredients were mixed as above described. The emulsion was poured through a screen into a 10% calcium chloride bath and the pellets formed were allowed to remain in the bath 10 minutes. The pellets were then dried to constant weight in an oven maintained at 100° F. Distillation of the pellets gave the following analysis:

| | Per cent |
|---|---|
| Gasoline | 87 |
| Water | 2.9 |
| Solids | 9.7 |

The sample also showed a high percentage of retained starting fuel, the amount being from 85–90% of the original starting hydrocarbon.

In order to prevent the tendency of the emulsion to form long strings or to clog the screen and to assure ball formation, I have found that a screen with $\tfrac{3}{16}''$ holes on $\tfrac{1}{4}''$ centers has been most satisfactory.

I have found that pellets prepared according to my invention have retained the liquid hydrocarbon even when stored at high temperatures, such as 100° F., for a considerable length of time.

The following table shows a typical comparative analysis of the original liquid hydrocarbon employed and the hydrocarbon after extraction from the pellets:

Table

GASOLINE ANALYSIS

| Test | Original Aviation 80 Octane | Extracted Fuel |
|---|---|---|
| Gravity (API) | 68.6 | 68.3 |
| Color | 27 | 27 |
| Doctor | Passes | Passes |
| Sulfur per cent | 0.015 | 0.014 |
| Reid Vapor Press, p. s. i. | 6.7 | 5.2 |
| Corrosion | Passes | Passes |
| Gum (Copper dish) mg./100 ml. | 3.5 | 8.5 |
| Distillation: | | |
| 25.0% ° F | 162 | 168 |
| 37.5% ° F | 171 | 180 |
| 50.0% ° F | 180 | 187 |
| 90.0% ° F | 230 | 234 |
| End Pt. ° F | 293 | 304 |
| Recovery per cent | 98.0 | 98.0 |
| Loss do | 1.0 | 1.0 |
| Residue do | 1.0 | 1.0 |
| Tetra-Ethyl Lead | None | None |

A comparison of the flammability of my solidified hydrocarbon fuel and ordinary liquid hydrocarbon fuel shows that the solidified fuel burns almost as readily as the liquid fuel, but it is far more easily controlled. The solidified fuel produces flame which is very easily extinguished whereas the liquid hydrocarbon fire is difficultly brought under control with one one-gallon carbon dioxide extinguisher. The following tests demonstrate the relative flammability of the two fuels.

Two five-gallon tin cans containing solidified aviation gasoline were simultaneously fired with 50 caliber incendiary bullets. It was observed that the tins were demolished and that the solid fuel scattered and burned moderately, being easily extinguished with carbon dioxide. Subsequently, two standard five-gallon army gasoline containers filled with solid fuel were fired with approximately the same results, except that one can required two incendiary rounds before it was ignited. Two tin cans, similar to those referred to above, but filled with liquid 80 octane aviation gasoline, were then fired, producing violent fire and explosion, with flames reaching 50 to 70 feet in height. Scattered fires were produced on a circle of about 40 feet in diameter as burning gasoline was violently blown from the containers. Two standard army cans (identical with the ones used above) were fired and both produced considerable fires, although one can burned relatively slowly while the other exploded violently.

A cross-section of one of the pellets examined under the microscope reveals an outer barrier layer of calcium alginate and small droplets of the liquid hydrocarbon dispersed in and surrounded by calcium alginate protective barriers. I believe that one of the reasons for the easily controlled burning of the pellets depends on the fact that the calcium alginate walls are broken down gradually to release small amount of liquid hydrocarbon from time to time rather than releasing the whole amount at once so as to produce a violent explosion.

Various advantages of this process are that it produces a solidified non-explosive product that can be shipped safely by any means of transportation, such as by truck, rail, ship, or by air. Further, the product may be stored anywhere, as on ice or in water, etc., without requiring extensive tank facilities.

While the above process has been described to produce pellets, it will be apparent that the solidified liquid hydrocarbon may be produced in the form of sheets or blocks according to the process of my invention.

It will be apparent to those skilled in the art that various changes and modifications may be made without departing from the spirit and scope of my invention.

I claim as my invention:

1. A new composition of matter comprising a non-explosive mass of solidified pellets of a liquid hydrocarbon fuel that normally is highly combustible, said solidified pellets being prepared by dispersing said liquid hydrocarbon fuel in a solidifying composition in which sodium alginate, dextrine and sucrose are the sole solidifying ingredients for the hydrocarbon fuel, said solidifying composition consisting essentially of an aqueous mixture of sodium alginates consisting essentially of an unrefined sodium alginate of relatively high viscosity containing about 10 to 12% insoluble matter in the form of cellulose and a refined sodium alginate of relatively low viscosity containing dextrine and sucrose, and introducing the resulting dispersion in sub-divided form into an approximately 10% calcium chloride bath to produce a mass of solid gel pellets containing the liquid hydrocarbon fuel dispersed in and surrounded by solid protective barriers of calcium alginate, dextrine and sucrose, the total amount of sodium alginates used being about 4% by weight of the starting liquid hydrocarbon fuel.

2. A process for the preparation of a non-explosive mass of solidified pellets of a liquid hydrocarbon fuel that normally is highly combustible comprising dispersing said liquid hydrocarbon fuel in a solidifying composition in which sodium alginate, dextrine and sucrose are the sole solidifying ingredients for the hydrocarbon fuel, said solidifying composition consisting essentially of an aqueous mixture of sodium alginates consisting essentially of an unrefined sodium alginate of relatively high viscosity containing about 10 to 12% insoluble matter in the form of cellulose and a refined sodium alginate of relatively low viscosity containing dextrine and sucrose, and introducing the resulting dispersion in subdivided form into an approximately 10% calcium chloride bath to produce a mass of solid gel pellets containing the liquid hydrocarbon fuel dispersed in and surrounded by solid protective barriers of calcium alginate, dextrine and sucrose, the total amount of sodium alginate being about 4% by weight of the starting liquid hydrocarbon fuel.

3. A new composition of matter comprising a liquid hydrocarbon fuel of a type which, when exposed in bulk form to the atmosphere, normally ignites with explosive or near-explosive violence, said composition containing said liquid hydrocarbon fuel in "solidified" pellet form prepared by dispersing said liquid hydrocarbon fuel in an aqueous solidifying composition in which sodium alginate, dextrine and sucrose are the sole solidifying ingredients for the hydrocarbon fuel, and introducing the resulting dispersion in subdivided form into an approximately 10% calcium chloride bath to form a mass of pellets, the total amount of sodium alginate used being about 4% by weight of the starting liquid hydrocarbon fuel, and the resulting mass of "solidified" pellets each containing said liquid hydrocarbon fuel in the form of small droplets dispersed in and surrounded by solid protective walls or barriers of calcium alginate, dextrine and sucrose.

REGIS RAAB.

REFERENCES CITED

The following references are of record in the file of this patent:

FOREIGN PATENTS

| Number | Country | Date |
|--------|---------|------|
| 450,206 | Great Britain | July 13, 1936 |
| 481,392 | Great Britain | Mar. 10, 1938 |
| 860,470 | France | Sept. 30, 1940 |